United States Patent
Ito

(10) Patent No.: US 6,223,723 B1
(45) Date of Patent: May 1, 2001

(54) PERSONAL WATERCRAFT ENGINE CONTROL

(75) Inventor: Kazumasa Ito, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/300,418

(22) Filed: Apr. 26, 1999

(30) Foreign Application Priority Data

Apr. 24, 1998 (JP) .................................................. 10-115795

(51) Int. Cl.$^7$ ........................................................ F02P 5/15
(52) U.S. Cl. ....................................................... 123/406.51
(58) Field of Search ........................ 123/406.51; 440/84, 440/87

(56) References Cited

U.S. PATENT DOCUMENTS

| | | | |
|---|---|---|---|
| 4,633,834 | 1/1987 | Takeuchi et al. | 123/406.53 |
| 4,955,831 | 9/1990 | Inoue et al. | 441/1 |
| 5,197,430 | 3/1993 | Hoshiba et al. | 123/406.54 |
| 5,309,882 | 5/1994 | Hoshiba et al. | 123/339.11 |
| 5,450,828 | 9/1995 | Sakamoto et al. | 123/339.11 |
| 5,566,657 | * 10/1996 | Hosoe | 123/406.51 |
| 5,722,370 | 3/1998 | Koike et al. | 123/406.11 |
| 5,738,073 | 4/1998 | Koike et al. | 123/406.55 |
| 5,775,297 | 7/1998 | Koike et al. | 123/406.51 |

* cited by examiner

*Primary Examiner*—Andrew M. Dolinar
(74) *Attorney, Agent, or Firm*—Knobbe, Martens, Olson & Bear, LLP

(57) ABSTRACT

An engine control system quantifies engine acceleration advances ignition timing in accordance with the quantified engine acceleration. The control system includes a controller that receives signals indicative of engine speed and crankshaft angle and periodically determines whether the engine acceleration falls into one of four quantified ranges of acceleration: a rapid acceleration range, a moderate acceleration range, a gradual acceleration range; and a range of de minimis acceleration (i.e., substantially no acceleration). The controller then adjusts ignition timing according to engine speed and to the particular acceleration range. In doing so, the controller determines a desired ignition timing by referencing ignition timing maps stored in the memory of the control system. Each map corresponds to one of the acceleration ranges. By quantifying acceleration into several ranges, the controller can better tailor ignition timing to optimize engine performance and provide smoother acceleration, regardless of the degree of acceleration. The ride of the watercraft during accelerations consequently improves.

12 Claims, 3 Drawing Sheets

PERSONAL WATERCRAFT ENGINE CONTROL

BACKGROUND OF THE INVENTION

1. Field of the Invention

This invention relates to a control system for an engine of a small watercraft, such as a personal watercraft, and more particularly to an engine ignition control system for such a watercraft.

2. Description of the Related Art

Internal combustion engines commonly include a spark advance system to control the time of initiating combustion in response to engine running conditions. The optimum time of spark plug firing for a given running condition enhances engine performance.

Optimum spark timing for an engine depends upon a variety of factors and primarily upon the load on the engine and the engine speed. Some spark advance systems also vary spark timing when sensing engine acceleration. Many types of conventional engine ignition systems include a spark advance mechanism that interrelates with the throttle valve of the engine so as to adjust spark timing in response to throttle valve position. The throttle valve position is directly related to the engine load. In some cases, the spark advance mechanisms are mechanical and include a linkage system that directly interconnects a throttle mechanism of the engine and the spark advance mechanism. U.S. Pat. No. 5,653,208 discloses an example of such a mechanical ignition control system. More advanced engines often employ electronic control systems that employ sensors to determine the running condition of the engine, and produce a firing signal to time the firing of the spark plugs in accordance with an ignition timing map stored in the memory of the control system. U.S. Pat. No. 5,775,297 discloses an example of an electronic ignition control system. In such a system, ignition timing varies upon whether rapid acceleration from idle to a high engine speed is detected.

SUMMARY OF THE INVENTION

The present invention involves the recognition that the optimum spark timing varies with acceleration rates. An ignition control system thus desirably senses engine acceleration and controls ignition timing depending upon the acceleration rate. The control system of the present invention differentiates between at least three acceleration conditions and preferably more. For instance, in one mode, the ignition control system employs differing ignition timing maps depending upon whether the acceleration is rapid, moderate, gradual or de minimis (i.e., a generally constant engine speed).

Thus, in accordance with one aspect of the present invention, a watercraft is provided including a hull defining an engine compartment and an internal combustion engine located within the engine compartment. The engine includes at least one variable-volume chamber defined by at least first and second components. One of the components is movably contained within the other component and is connected to an output shaft of the engine so as to drive the output shaft in a rotational manner as a result of combustion within the chamber. An ignition system includes an ignition element that initiates combustion of a fuel/air mixture in the chamber, and a sensory system, which is responsive to at least engine speed, provides an engine speed signal. A controller communicating with the sensory system and with the ignition system. The controller is responsive to the engine speed signal to periodically determine whether engine acceleration is in one of at least three preset ranges of acceleration and to adjust ignition timing in response to the determine acceleration range.

In one mode, the preset ranges of acceleration correspond to substantially no acceleration, in which spark timing is adjusted in accordance with a normal ignition timing map, to rapid acceleration range, in which ignition timing is advanced relative to the normal ignition timing, and to at least one intermediate acceleration range, in which through at least some range of engine speeds the ignition timing is less advanced relative to the ignition timing for the rapid acceleration range. The controller can also further quantify the intermediate acceleration range into additional ranges to correspond to gradual acceleration and moderate acceleration. By quantifying acceleration into at least three and preferably more ranges, the ignition timing can be better tailored to optimize engine performance and provide smoother acceleration, regardless of the degree of acceleration. The ride of the watercraft during accelerations consequently improves.

Further aspects, features, and advantages of the present invention will become apparent from the detailed description of the preferred embodiment which follows.

BRIEF DESCRIPTION OF THE DRAWINGS

The above-mentioned and other features of the invention will now be described with reference to the drawings of preferred embodiments of the present watercraft exhaust system. The illustrated embodiments of the watercraft exhaust system are intended to illustrate, but not to limit the invention. The drawings contain the following figures.

DETAILED DESCRIPTION OF THE PREFERRED EMBODIMENT

Figure 1:
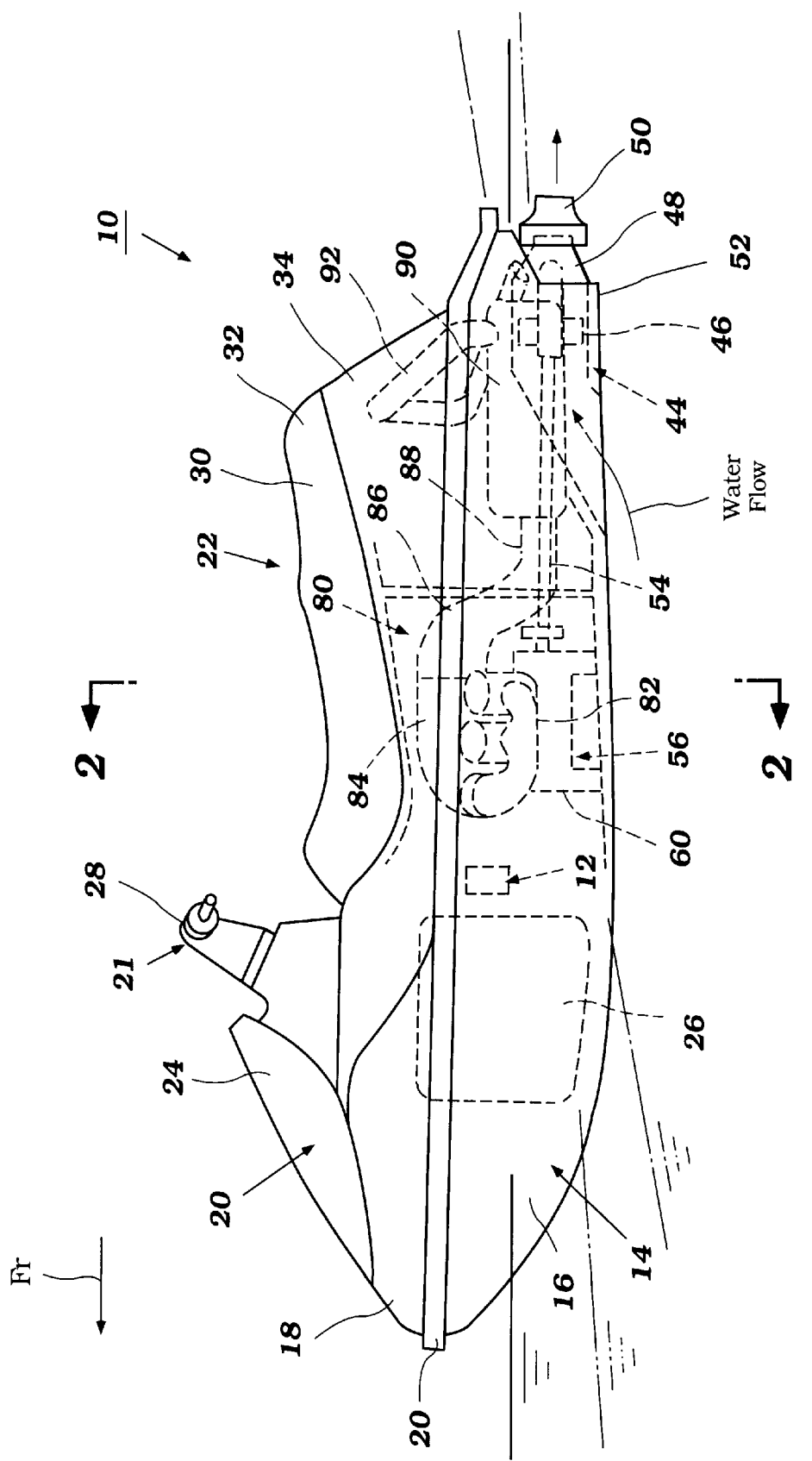
FIG. 1 is a side elevational view of a personal watercraft that includes an engine control system configured in accordance with a preferred embodiment of the present invention, with several internal components of the watercraft illustrated in phantom.
Figure 2:
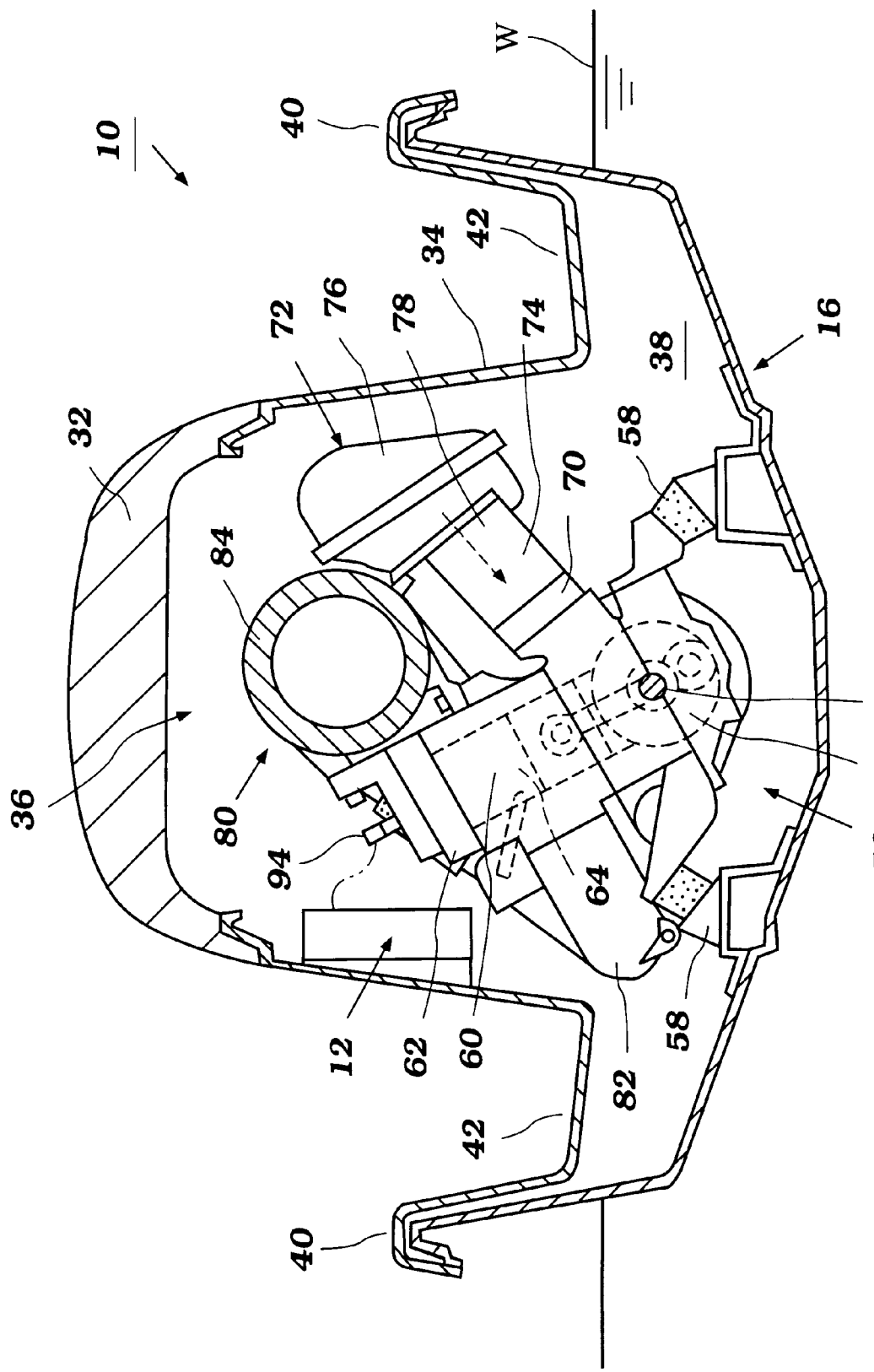
FIG. 2 is a cross-sectional view of the personal watercraft of FIG. 1 taken along line 2—2.

FIGS. 1 and 2 illustrate a personal watercraft 10 which includes an engine control system 12 configured in accordance with a preferred embodiment of the present invention. Although the present engine control system 12 is illustrated in connection with a personal watercraft, the engine control system can be used with other types of watercraft as well, such as, for example, but without limitation, small jet boats and the like. Before describing the operation of the engine control system 12, an exemplary personal watercraft 10 will first be described in general details to assist the reader's understanding of the environment of use and the operation of the engine control system 12.

The watercraft 10 includes a hull 14 formed by a lower hull section 16 and an upper deck section 18. The hull sections 16, 18 are formed from a suitable material such as, for example, a molded fiberglass reinforced resin. The lower hull section 16 and the upper deck section 18 are fixed to each other around the peripheral edges 20 in any suitable manner.

As viewed in the direction from the bow to the stern of the watercraft, the upper deck section 18 includes a bow portion 20, a control mast 21 and a rider's area 22. The bow portion 20 slopes upwardly toward the control mast 21 and includes at least one air duct through which air can enter the hull. Under some operating conditions, air can pass through the rear duct in both directions. A hatch cover 24 desirably extends above an upper end of the air duct to inhibit an influx of water into the hull.

A fuel tank 26 is located within the hull 14 beneath the hatch cover 24. Conventional means, such as, for example, straps, secure the fuel tank 26 to the lower hull 16. A fuel filler hose extends between a fuel cap assembly and the fuel tank 26. In the illustrated embodiment, the filler cap assembly (not shown) is secured to the bow portion 20 of the hull upper deck 18 to the side and in front of the control mast 21. In this manner, the fuel tank can be filled from outside the hull 14 with the fuel passing through the fuel filler hose into the tank 26.

The control mast 21 extends upward from the bow portion 20 and supports a handlebar assembly 28. The handlebar 28 controls the steering of the watercraft 10 in a conventional manner. The handlebar assembly 28 also carries a variety of controls of the watercraft 10, such as, for example, a throttle control, a start switch and a lanyard switch.

A display panel (not shown) desirably is located in front of the control mast 21 on the bow portion 20 and is orientated to be visible by the rider. The display panel desirably displays a number of performance characteristics of the watercraft, such as, for example, watercraft speed (via a speedometer), engine speed (via a tachometer), fuel level, oil level, engine temperature, battery charge level and the like.

The rider's area 22 lies behind the control mast 21 and includes a seat assembly 30. In the illustrated embodiment, the seat assembly 30 has a longitudinally extending straddle-type shape that may be straddled by an operator and by at least one or two passengers, and possibly more (e.g., 3 or 4). The seat assembly 30, at least in principal part, is formed by a seat cushion 32 supported by a raised pedestal 34. The raised pedestal 34 has an elongated shape and extends longitudinally along the center of the watercraft 10. The seat cushion 32 desirably is removably attached to a top surface of the pedestal 34 and covers the entire upper end of the pedestal for rider and passenger comfort.

As seen in FIG. 2, an access opening 36 is located on an upper surface of the pedestal 34. The access opening 36 opens into an engine compartment 38 formed within the hull 14. The seat cushion 32 normally covers and seals closed the access opening 36. When the seat cushion 32 is removed, the engine compartment 38 is accessible through the access opening 36.

The pedestal 34 also desirably includes at least one air duct located behind the access opening. The air duct communicates with the atmosphere through a space between the pedestal 34 and the cushion 32 which is formed behind the access opening. Air can pass through the rear duct in both directions under some operating conditions.

The upper deck section 18 of the hull 14 advantageously includes a pair of raised gunnels 40 (FIG. 3) positioned on opposite sides of the aft end of the upper deck assembly 18. The raised gunnels 40 define a pair of foot areas 42 that extend generally longitudinally and parallel to the sides of the pedestal 34. In this position, the operator and any passengers sitting on the seat assembly 30 can place their feet in the foot areas 42 with the raised gunnels shielding the feet and lower legs of the riders. A non-slip (e.g., rubber) mat desirably covers the foot areas 42 to provide increased grip and traction for the operator and the passengers. In the illustrated embodiment, the foot areas open into an aft deck located behind the seat assembly 30; however, it is understood that the watercraft can also include a closed stern.

The lower hull portion 16 principally defines the engine compartment 38. Except for the air ducts, the engine compartment 38 is normally substantially sealed so as to enclose an engine of the watercraft 10 from the body of water in which the watercraft is operated.

The lower hull 16 is designed such that the watercraft 10 planes or rides on a minimum surface area at the aft end of the lower hull 16 in order to optimize the speed and handling of the watercraft 10 when up on plane. For this purpose, the lower hull section generally has a V-shaped configuration formed by a pair of inclined sections that extend outwardly from a keel line of the hull to the hull's side walls at a dead rise angle. The inclined sections also extend longitudinally from the bow toward the transom of the lower hull 16. The side walls are generally flat and straight near the stern of the lower hull and smoothly blend towards the longitudinal center of the watercraft at the bow. The lines of intersection between the inclined section and the corresponding side wall form the outer chines of the lower hull section.

Toward the transom of the watercraft, the incline sections of the lower hull 16 extend outwardly from a recessed channel or tunnel that extends upward toward the upper deck portion 18. The tunnel has a generally parallelepiped shape and opens through the transom of the watercraft 10, as seen in FIG. 1.

In the illustrated embodiment, a jet pump unit 44 propels the watercraft 10. The jet pump unit 44 is mounted within the tunnel formed on the underside of the lower hull section 16 by a plurality of bolts. An intake duct of the jet pump unit 44 defines an inlet opening that opens into a gullet. The gullet leads to an impeller housing assembly in which an impeller 46 of the jet pump 44 operates. An impeller housing assembly also acts as a pressurization chamber and delivers the water flow from the impeller housing to a discharge nozzle housing 48.

A steering nozzle 50 is supported at the downstream end of the discharge nozzle by a pair of vertically extending pivot pins. In an exemplary embodiment, the steering nozzle 50 has an integral lever on one side that is coupled to the handlebar assembly 28 through, for example, a bowden-wire actuator, as known in the art. In this manner, the operator of the watercraft can move the steering nozzle 50 to effect directional changes of the watercraft 10.

A ride plate 52 covers a portion of the tunnel behind the inlet opening to enclose at least a portion of the jet pump unit 44 within the tunnel. In this manner, the lower opening of the tunnel is closed to provide in part a planing surface for the watercraft 10.

An impeller shaft 54 supports the impeller within the impeller housing of the unit 44. The aft end of the impeller shaft is suitably supported and journalled within the compression chamber of the assembly in a known manner. The impeller shaft extends in the forward direction through a front wall of the tunnel and through a bulkhead, as seen in FIG. 1.

An internal combustion engine 56 of the watercraft powers the impeller shaft 54 to drive the impeller 46 of the jet pump unit 44. The engine 56 is positioned within the engine compartment 38 and is mounted primarily beneath the seat assembly 30 generally at the center of the watercraft. As best seen in FIG. 2, vibration-absorbing engine mounts 58 secure the engine 56 to the lower hull portion 16 in a known manner.

In the illustrated embodiment, the engine 56 includes two in-line cylinders and operates on a two-stroke, crankcase compression principle. The engine 56 is positioned such that the row of cylinders lies parallel to a longitudinal axis of the watercraft 10, running from bow to stem. The axis of each cylinder is skewed or inclined relative to a vertical central plane of the watercraft 10, in which the longitudinal axis lies. This engine type, however, is merely exemplary. Those skilled in the art will readily appreciate that the present engine control system can be used with any of a variety of engine types having other number of cylinders, having other cylinder arrangements and operating on other combustion principles (e.g., four-stroke principle).

As best seen in FIG. 2, a cylinder block 60 and a cylinder head assembly 62 desirably form the cylinders 64 of the engine 56. A piston reciprocates within each cylinder 64 of the engine 56 and together the pistons drive an output shaft 66, such as a crankshaft, in a known manner. A connecting rod links the corresponding piston to the crankshaft 66. The corresponding cylinder bore, piston and cylinder head of each cylinder forms a variable-volume chamber, which at a minimum volume defines a combustion chamber.

The crankshaft 66 desirably is journalled with a crankcase, which in the illustrated embodiment is formed between a crankcase member 68 and a lower end of the cylinder block 60. Individual crankcase chambers of the engine are formed within the crankcase by dividing walls and sealing disks, and are sealed from one another with each crankcase chamber communicating with a dedicated variable-volume chamber.

Each crankcase chamber also communicates with an intake passage or pipe 70 of an induction system 72 through a check valve (e.g., a reed-type valve), which is disposed between the corresponding intake pipe 70 and the crankcase chamber. In the illustrated embodiment, each intake pipe 70 is separately formed from the cylinder block 60; however, the intake pipes 70 can integrally form with either the crankcase member 68 or the cylinder block 60.

The induction system includes at least one charge former 74 that produces the fuel charge which is delivered to the cylinders 64 in a known manner. In the illustrated embodiment, each intake pipe 70 communicates with a carburetor 74 that is attached to an inlet end of the intake pipe 70. The charge former alternatively can be a fuel injector that injects fuel in the induction system (i.e., upstream of the corresponding check valve), in the combustion chamber (i.e., direct injection), or into another chamber or passage (e.g., the crankcase chamber or scavenge passage (s)).

A fuel supply system (not shown) delivers fuel to the charge formers 74, and desirably circulates fuel through a fuel loop that extends between the charge formers 74 and the fuel tank 26. For this purpose, the fuel supply system includes at least one fuel pump either mechanically driven by the engine (e.g., a diaphragm pump driven by pressure fluctuations within the crankcase chamber) or electrically driven in a known manner.

The induction system 72 also includes an air intake silencer 76 that is connected to an air inlet end of a throttle passage 78 of each carburetor 74. The flow path from the air intake silencer 76, through the carburetor 74 and intake pipe 70 and into the corresponding crankcase chamber desirably is along a flow axis which generally is inclined relative to the central vertical plane and lies on a side of the plane opposite of the corresponding cylinder.

The induction system 72 also includes a throttle device to regulate air flow through the induction system 72 and into the corresponding crankcase chamber. In the illustrated embodiment, rotational throttle valves are located within the throttle passages 78 of the carburetors 74 and a conventional actuation system, which is operated by the throttle lever on the handlebar assembly 28, actuates the throttle valves desirably in unison. Other types of throttle devices also can be used to control air flow into the engine and the throttle devices need not be operated in unison.

Variation in throttle opening angle changes engine speed, as known in the art. The engine 56 desirably operates over a range of speeds, as understood from FIG. 3. In the illustrated embodiment, the engine 56 idles generally at 1500 rpm once started and operates within a low speed range (e.g., from about 1500 rpm to about 3500 rpm) when moving through the water in a non-planing condition. The watercraft 10 begins to plane when the engine reaches a planing transient speed, e.g., 3500 rpm. The watercraft 10 is fully up on plane once a full planing speed is reached, e.g., at speeds exceeding 4500 rpm. A planing transient speed range thus occurs between the planing transient speed and the full planing speed (e.g., between 3500 rpm and 4500 rpm), and a full planing speed range occurs at speeds above the full planing speed (e.g., 4500 rpm).

An exhaust system 80 discharges exhaust byproducts from the engine 56 to the atmosphere and/or to the body of water in which the watercraft 10 is operated. As best seen in FIGS. 1 and 2, the exhaust system 80 includes the exhaust manifold 82 that is affixed to the side of the cylinder block 60 and which receives exhaust gases from the combustion chambers through exhaust ports in a well-known manner. The exhaust manifold desirably includes a number of runners equal in number to the number of cylinders. Each runner communicates with the exhaust port(s) of the respective cylinder. The runners of the exhaust manifold 82 thence merge together to form a common exhaust path that terminates at an outlet end of the manifold 82.

An exhaust valve can be disposed within the exhaust port corresponding to each cylinder. These exhaust valves open and close to control the flow of exhaust gases from each cylinder into the corresponding runners of the exhaust manifold 82. As is well known to those skilled in the art, the timing of the opening and closing of these valves is preferably such that the exhaust port opening is retarded at low engine speeds and is advanced during higher engine speeds.

An outlet end of the exhaust manifold 82 communicates with an exhaust expansion chamber 84. As best seen in FIG. 1, the outlet end of the manifold 82 turns upward to mate with a down-turned inlet end of the expansion chamber 84.

With reference to FIG. 2, the expansion chamber 84 has generally a tubular shape with an enlarged cross-sectional flow area as compared to the exhaust manifold 82 to allow the exhaust gases to expand and silence, as known in the art. A thick-wall, which is defined between an inner surface and an outer surface, forms the tubular shape of the exhaust chamber 84. The inner surface defines the exhaust flow passage through the exhaust chamber 84. A plurality of water passages (not shown) can extend along side the flow passage through the thick wall of the exhaust chamber 84. The water passages desirably are spaced about the inner surface.

The expansion chamber 84 wraps around the front side of the engine 56 and then extends rearward through a space (i.e., valley) formed between the induction system 72 and the cylinder block 60/cylinder head 62 assembly.

An outlet end of the exhaust chamber 84 communicates with an inlet end of a lower exhaust chamber 86. As seen in FIG. 1, the exhaust chamber 86 turns down into a vertical section (goose neck-like section) and thence transitions to a lower discharge end arranged to give the exhaust chamber 86 a generally reverse S-like shape. The exhaust chamber 86 also extends to one side of the engine 56.

A flexible pipe section 88 is connected to the discharge end of the exhaust chamber 86. The flexible conduit 88 connects to an inlet section of a water trap device 90. The water trap device 90 also lies within the watercraft hull 14 on the same side of the tunnel. The water trap device 90 has a sufficient volume to retain water and to preclude the back flow of water to the expansion chamber 84 and the engine 56. Internal baffles within the water trap device 90 help control water flow through the exhaust system 80.

An exhaust pipe 92 extends upward from the water trap device 90, extends over the tunnel, and connects to a discharge opening (not shown). The discharge opening can be located either on the transom or on a wall of the tunnel to exhaust into the tunnel, as known in the art.

The personal watercraft 10 so far described represents only an exemplary watercraft on which the present engine control system 12 can be employed. A further description of the personal watercraft 10 is not believed necessary for an understanding and an appreciation of the present control system 12. The engine control system will now be described in detail.

The engine control system 12 operates to control ignition timing and possible other functions of the engine, such as, for example, the richness of the fuel/air charge formed by the fuel chargers and the opening degree of the throttle valves. In the illustrated embodiment, the engine control system 12 communicates with an ignition system that effects ignition of the fuel/air charge within the cylinders 64 in a known manner. The ignition system includes a charging coil for generating an ignition current. This ignition current is supplied to an ignition coil and thence to an ignition or spark plug 94 corresponding to each of the cylinders 64.

The engine control system 12 also communicates with a sensory system that includes at least an engine speed sensor and a crankshaft angle sensor. The sensory system can also include a throttle valve angle sensor to determine the opening degree of the throttle valve(s). These sensors output a signal, which is indicative of sensed operating condition of the engine (e.g., engine speed, crankshaft angle, etc.).

The engine control system 12 controls ignition timing primarily in accordance with sensed engine speed and acceleration in order to obtain desired engine performance. For this purpose, the control system 12 includes a controller that receives the output signals from the sensor. To determine engine rotational speed, as well as possibly a throttle valve angle sensor. The controller periodically determines engine speed and engine acceleration based at least in part upon the input signals, and uses the determined engine speed and acceleration to either advance or retard ignition timing. The controller also includes a memory device that stores several ignition timing maps. One map relates to a baseline or normal operation, while at least two other maps relate to various acceleration rates. In a preferred variation, the memory device stores maps that relate to a gradual acceleration, a moderate acceleration and a rapid acceleration, as understood from FIG. 3. The controller produces firing signals which fire the spark plugs 94 at the desired time within the engine cycle. The measurement of engine acceleration and the determination of ignition adjustment can be performed by the same or separate logic components; however, "controller" as used herein means the logic component or components that perform these functions, regardless of packaging.

In accordance with a preferred mode of operation, the ignition control sub-system advances spark timing, relative to spark timing at a higher speed, in order to inhibit back firing of the engine which can occur at low engine speeds (e.g., less than 2000 rpm). The spark timing is held generally constant once the engine is started and operated within a range from idling speed (e.g., 1500 rpm) up to a preset low engine speed (e.g., 2000 rpm). In the illustrated embodiment, the spark advance is about 17° to 18° before top dead center (BTDC). Above the preset low engine speed (e.g., 2000 rpm), the ignition control sub-system either advances or retards spark timing depending upon engine acceleration and speed.

Figure 3:
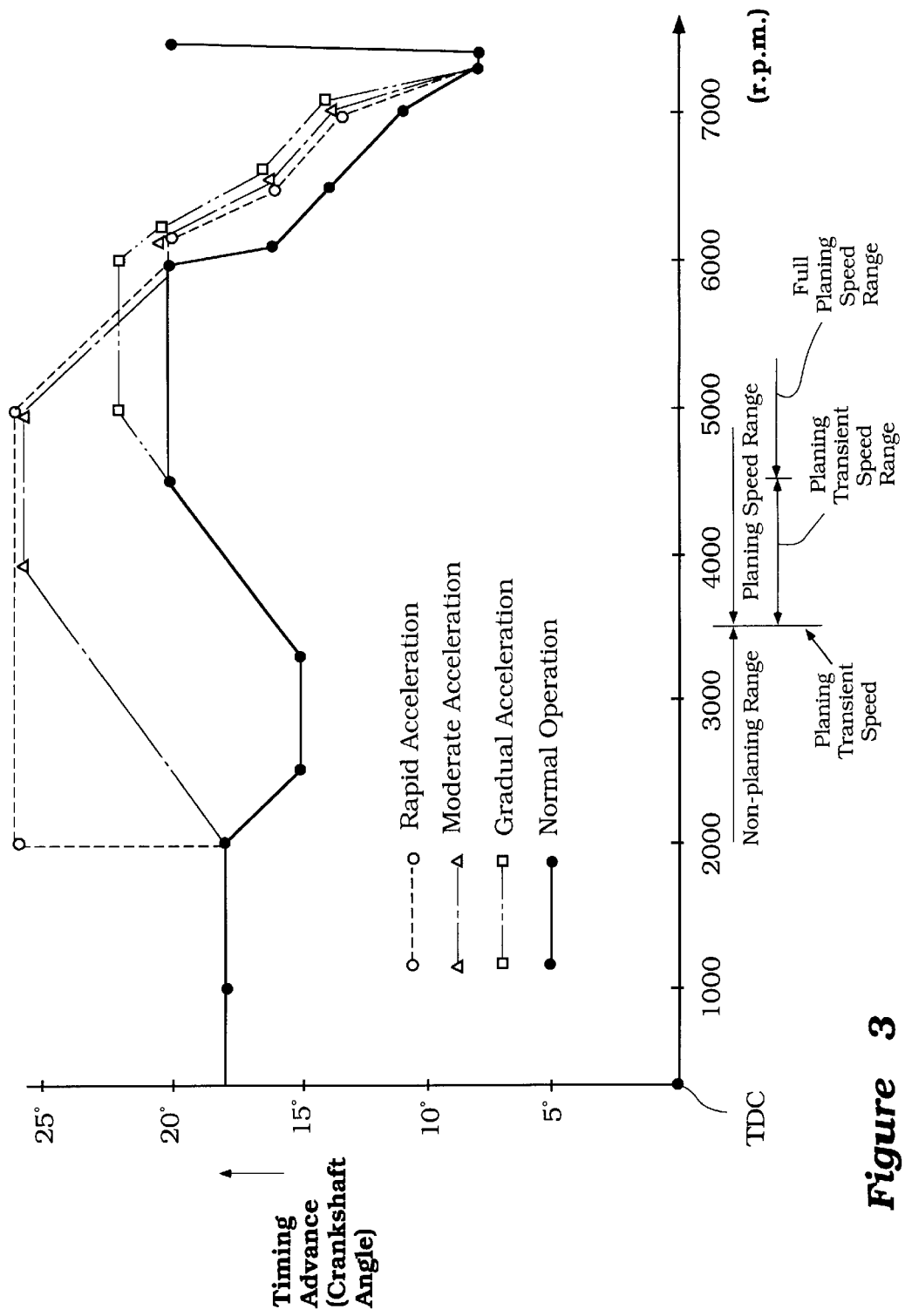
FIG. 3 is a graph illustrating several maps of ignition advance versus engine speed, including a baseline map and maps for various rates of acceleration, which the engine control system employs to promote smooth acceleration at various acceleration rates.

In the present system, as noted above, spark timing depends upon the degree of acceleration above the preset low engine speed (e.g., 2000 rpm). For rapid acceleration, spark timing is immediately advanced above the idle/low speed spark advance (e.g., 17–18° BTDC) if the engine speed exceeds the preset low speed (e.g., 2000 rpm) but is less than an upper engine speed limit (e.g., 7300 rpm). In the illustrated mode, rapid acceleration occurs when an increase in engine speed of more than 150 rpm is detected in 0.05 seconds. Spark timing is advanced to about 25°–26° BTDC for engine speeds within the range of about 2000 rpm to about 5000 rpm. Spark timing is gradually retarded as engine speed increases above a preset speed (e.g., 5000 rpm) as illustrated in FIG. 3. In the illustrated embodiment, spark timing under a rapid acceleration operating condition is retarded from about 25° to about 8° BTDC over a range of engine speeds from about 5000 rpm to about 7300 rpm. As seen in FIG. 3, this portion of the map has a generally linear profile, although several knees do occur within the graph.

For moderate acceleration, the spark timing is gradually increased from about 17° or 18° to about 25° BTDC over a range of engine speeds from 2000 rpm to about 4000 rpm. Spark timing remains constant at about 25° BTDC from about 4000 rpm to about 5000 rpm. Above 5000 rpm, the spark timing map for moderate acceleration generally approximates the map for rapid acceleration, as seen in FIG. 3. In the illustrated mode, moderate acceleration occurs when an increase in engine speed of more than 100 rpm but not more than 150 rpm is detected in 0.05 seconds.

For gradual acceleration, the spark timing is initially retarded while engine speed remains within the non-planing range (e.g., above the preset low engine speed of 2000 rpm but is less than planing transient speed of 3500 rpm). In the illustrated mode, gradual acceleration occurs when an increase in engine speed of more than 50 rpm but not more that 100 rpm is detected in 0.05 seconds. Spark timing is retarded generally to 14° to 15° BTDC within this speed range. Spark timing is advanced to about 19° to 20° BTDC as engine speed increases through the planing transient speed range (e.g., from 3500 rpm to 4500 rpm) and generally to 5000 rpm. Spark timing remains constant generally at 22° BTDC from about 5000 rpm to about 6100 rpm. Above 6100 rpm, the spark timing map for gradual acceleration generally approximates the maps for rapid and moderate accelerations, as seen in FIG. 3.

For a normal operating condition, where engine speeds remain generally steady (i.e., constant or experience de minimis acceleration increase of less than 50 rpm in 0.05 rpm), the spark timing map generally matches the gradual acceleration map described above through the non-planing speed range (e.g., idle to 3500 rpm) and through the transient speed range (e.g., 3500 rpm to 4500 rpm). Spark timing holds constant generally at 20° BTDC for engine speeds within at least a portion of the planing speed range (e.g., between 4500 rpm and 6000 rpm). Above a preset high speed (e.g., 6000 rpm), spark timing is initially rapidly and then linearly retarded from 20° to about 8° BTDC over a high speed engine range (e.g., 6000 rpm to 7300 rpm). As seen in FIG. 3, spark timing for normal operation is retarded in comparison to the rapid, moderate and gradual acceleration modes in this high speed range.

The maps for the three acceleration modes and for normal operation converge generally at a preset upper speed (e.g., 7300 rpm). Spark timing is immediately advanced to about 20° BTDC for speeds above the preset upper speed, as seen in FIG. 3.

As appreciated from the above description and the maps depicted in FIG. 3, the igniting timing maps for gradual, moderate and rapid acceleration periods are substantially identical to each other at engine speeds above a high engine speed (e.g., 6100 rpm). Ignition timing is also advanced over ignition time for normal operation at least through a portion of the planing speed range (e.g., 3500 rpm to 7300 rpm) when experiencing rapid, moderate or gradual acceleration. As such, the engine can respond quickly to accelerating operations at engine speeds within the planing speed range. As seen in FIG. 3, ignition timing is advanced above that for normal operation for rapid and moderate accelerating conditions at engine speeds above the preset low speed (e.g., 2000), and ignition timing for gradual acceleration is advanced above that for normal operation at engine speeds above the transient speed range (e.g., 3500 rpm to 4500 rpm).

In addition, if the engine speed is less than the planing transient speed (e.g., 3500 rpm) and engine rotation is gradually accelerated, the ignition timing generally matches that associated with normal operation. With this engine operation, engine knocking is inhibited when operating at non-planing speeds (e.g., less than 3500 rpm), and fuel economy is improved. If the engine is moderately or rapidly accelerated in at least part of the range below the planing transient speed, the ignition timing is advanced over normal ignition timing associated with normal operation in order to smooth engine operation and enhance a comfortable ride for a rider(s).

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. A small watercraft including a hull defining an engine compartment and an internal combustion engine located within the engine compartment, the engine including at least one variable-volume chamber defined by at least first and second components with one of the components being moveably contained within the other components and connected to an output shaft so as to drive the output shaft in a rotational manner as a result of combustion within the chamber, an ignition system including an ignition element that initiates combustion of a fuel/air mixture in the chamber, a sensory system responsive to at least engine speed to provide an engine speed signal, and a controller communicating with the sensory system and with the ignition system, the controller being responsive to the engine speed signal to periodically determine whether engine acceleration is in one of at least three present ranges of acceleration, to determine a parameter corresponding to a planing state of the watercraft, and to adjust ignition timing in response to the determined acceleration range and the determined parameter to a value appropriate for the planing state of the watercraft.

2. A small watercraft as in claim 1, wherein the controller provides an output signal to the ignition system to trigger the ignition element.

3. A small watercraft as in claim 1, wherein the controller includes a memory device that contains ignition timing maps for each acceleration range.

4. A small watercraft as in claim 1, wherein one of the ranges of acceleration is not less than 150 rpm per 0.05 seconds.

5. A small watercraft as in claim 1, wherein the parameter is engine acceleration.

6. A small watercraft including a hull defining an engine compartment and an internal combustion engine located within the engine compartment, the engine including at least one variable-volume chamber defined by at least first and second components with one of the components being movably contained within the other component and connected to an output shaft so as to drive the output shaft in a rotational manner as a result of combustion within the chamber, an ignition system including an ignition element that initiates combustion of a fuel/air mixture in the chamber, a sensory system responsive to at least engine speed to provide an engine speed signal, and a controller communicating with the sensory system and with the ignition system, the controller being responsive to the engine speed signal to periodically determine whether the engine acceleration is in one of at least three preset ranges of acceleration and adjusting ignition timing in response to the determined acceleration range, wherein the controller includes a memory device that contains ignition timing maps for each acceleration range and wherein the ignition maps for at least two of the preset acceleration ranges are substantially identical over an entire engine speed range below a preset planing transient engine speed.

7. A small watercraft as in claim 6, wherein at least one of the preset acceleration ranges corresponds to a range of substantially no acceleration.

8. A small watercraft as in claim 7, wherein said range does not include accelerations greater than 50 rpm per 0.05 seconds.

9. A small watercraft including a hull defining an engine compartment and an internal combustion engine located within the engine compartment, the engine including at least one variable-volume chamber defined by at least first and second components with one of the components beings movably contained within the other component and connected to an output shaft so as to drive the output shaft in a rotational manner as a result of combustion within the chamber, an ignition system including an ignition element that initiates combustion of a fuel/air mixture in the chamber, a sensory system responsive to at least engine speed to provide an engine speed signal, and means for periodically determining engine acceleration in response to the engine speed signal and for adjusting ignition timing in accordance with at least three ignition timing modes depending upon whether the determined engine acceleration is in one of at least three ranges of acceleration, which correspond respectively to the at least three ignition timing modes, wherein the three timing modes adjust the ignition timing differently over a first range of engine speeds, at least two of the timing modes adjusting the ignition timing substantially identically over a second range of engine speeds which is higher than the first range of engine speeds.

10. The watercraft according to claim 9, wherein the second range of engine speeds includes all engine speeds over a predetermined engine speed.

11. A method of controlling the ignition timing of at least one ignition element corresponding to a variable volume chamber of an internal combustion engine, said method comprising measuring engine acceleration, determining whether the determined engine acceleration is in one of at least three ranges of acceleration, and adjusting ignition timing according to one of at least three speed responsive ignition timing modes in response to the determined range of acceleration, the at least three timing modes being different over a first range of engine speeds, at least two of the timing modes being substantially identical over a second range of engine speeds which is higher than the first range of engine speeds.

12. The method according to claim 11, additionally comprising determining a parameter corresponding to planing condition of a watercraft and adjusting the ignition timing appropriately for the planing condition for the watercraft.

* * * * *